May 2, 1967 W. J. ARMIGER, JR 3,317,200
GAS SCRUBBER
Filed Dec. 30, 1965 3 Sheets-Sheet 3
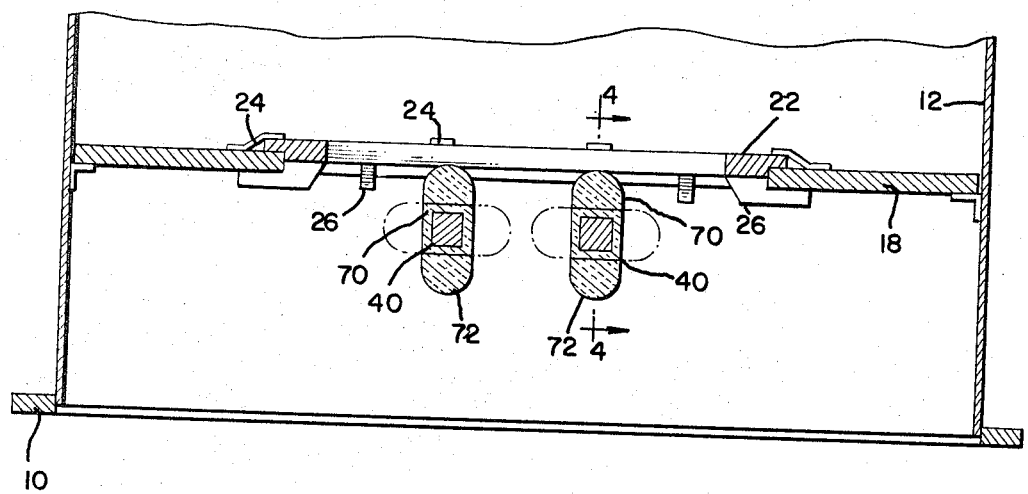
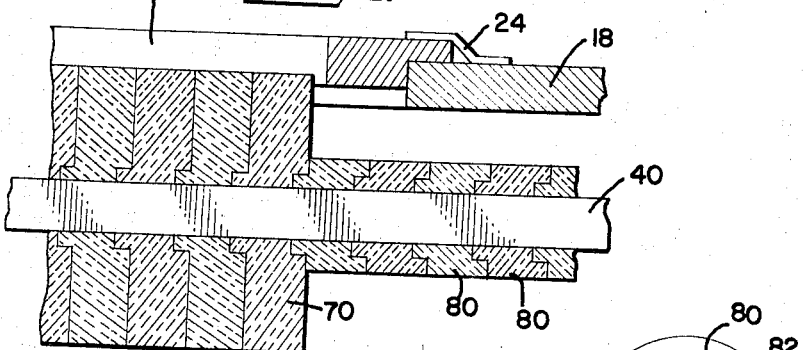
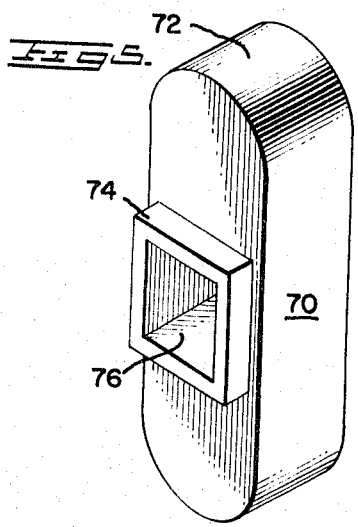
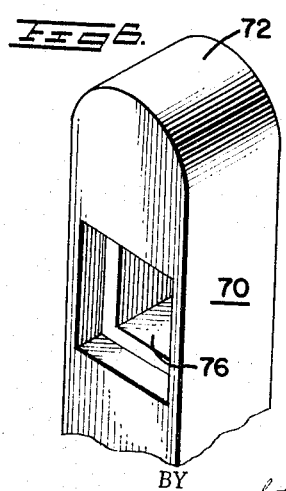
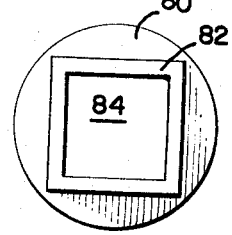
INVENTOR
WILLIAM J. ARMIGER JR.
BY
Stowell & Stowell
ATTORNEYS

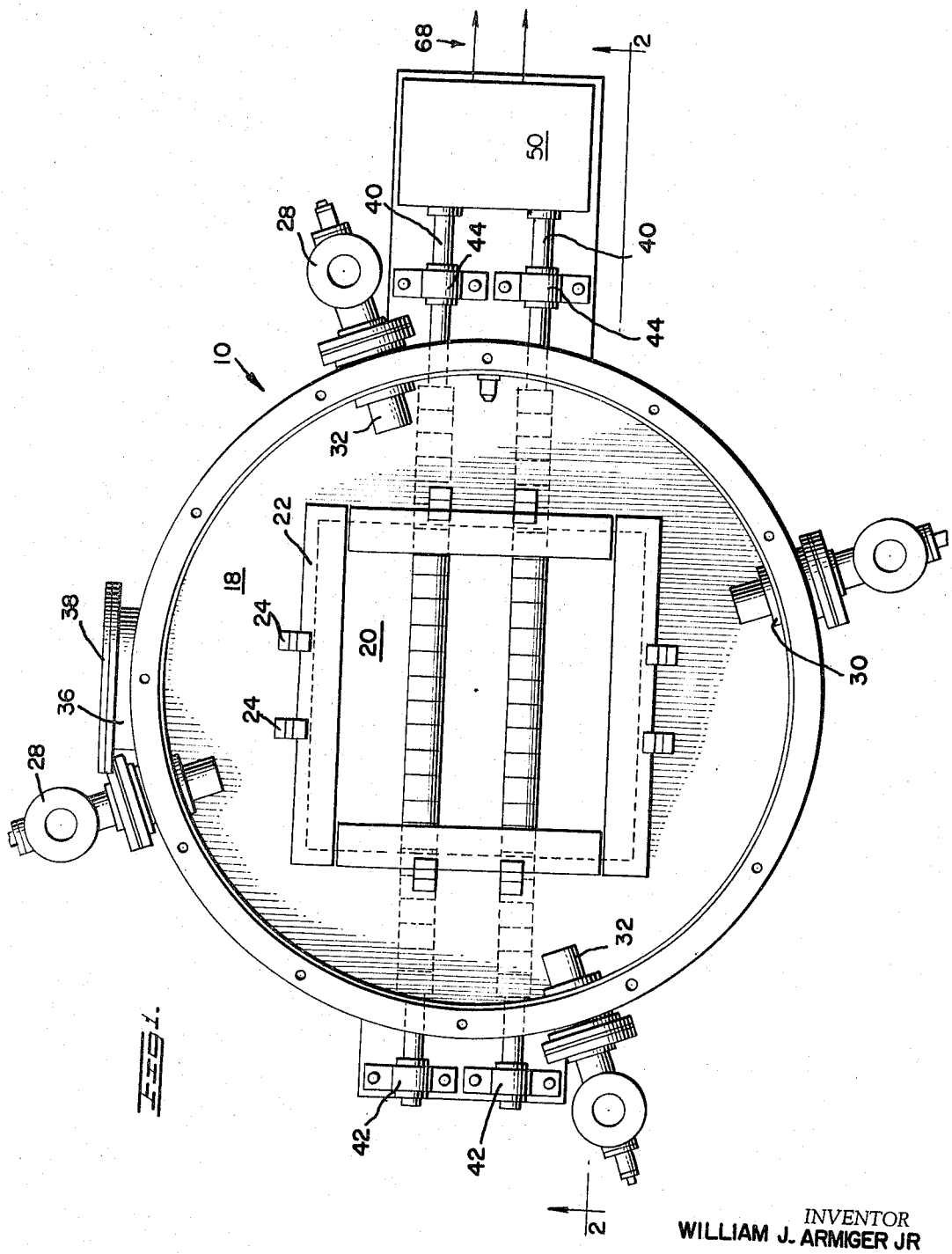

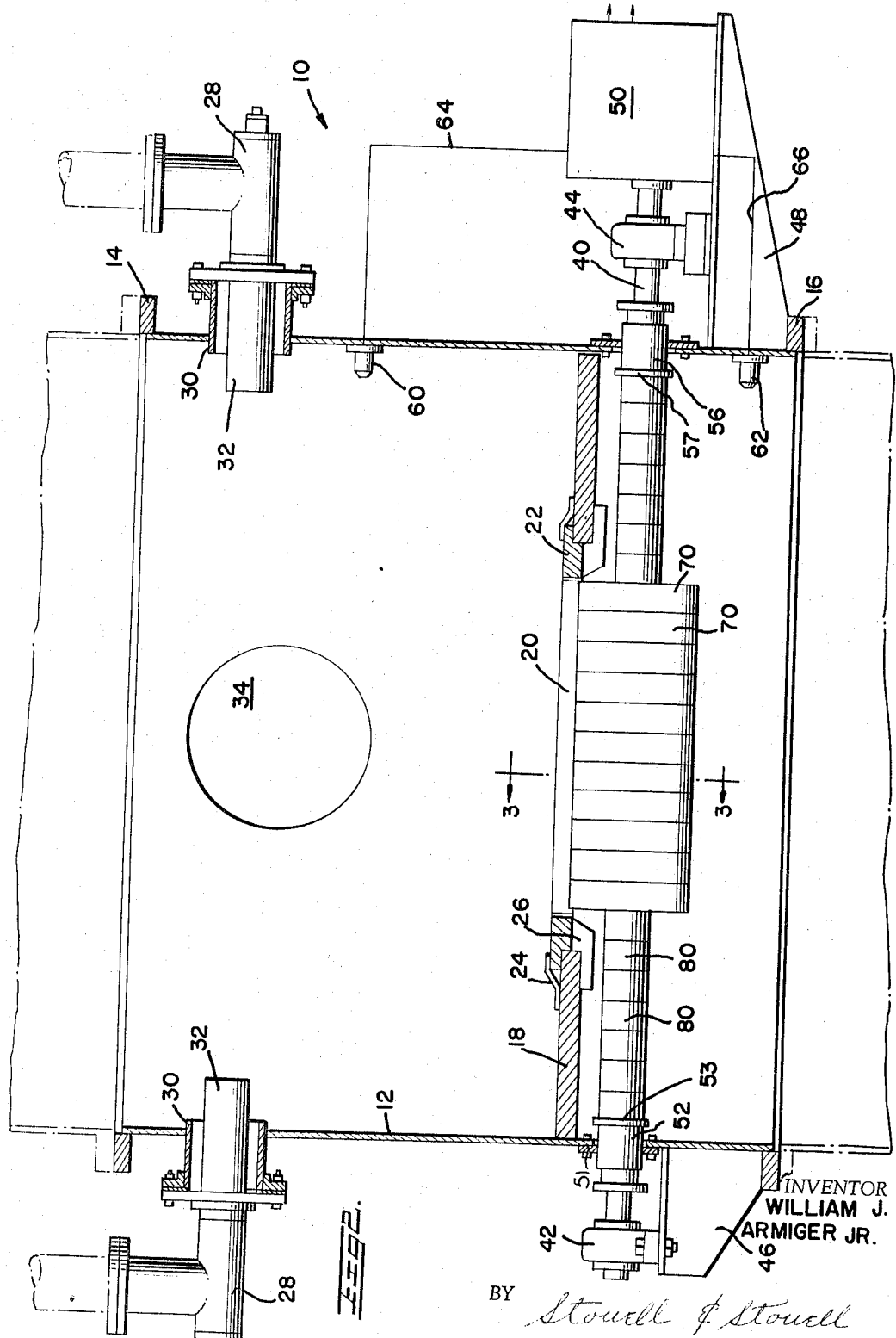

United States Patent Office 3,317,200
Patented May 2, 1967

3,317,200
GAS SCRUBBER
William J. Armiger, Jr., Princeton, N.J., assignor to Research-Cottrell, Inc., Bridgewater Township, N.J., a corporation of New Jersey
Filed Dec. 30, 1965, Ser. No. 517,675
5 Claims. (Cl. 261—64)

This invention relates to the scrubbing of particulate laden gases and more particularly to a device which performs the simultaneous functions of effecting a pressure drop across an orifice in a gas flow stream and of wetting the particulates by virtue of turbulence created by the gas flow through the orifice.

In many industrial processes, the wetting of the particles in a particle laden gas stream facilitates their subsequent removal from the gas stream thus both cleaning the gas and also assisting, in certain instances, in the recovery of the particles themselves. By placing an orifice in a duct wherein the orifice has a lesser aperture than the duct aperture which carries particle laden gases, a pressure change across the orifice is effected and it is in the area of this pressure drop that washing liquid, as for example, water, is introduced into the particle laden gas stream for intimate mixing of the gas with the liquid. In many instances, depending upon the particular nature of the gas and particles carried thereby and depending upon total system gas pressure requirements there is an optimum pressure loss across the orifice which should be maintained. This optimum pressure loss often varies continually. By the use of a variable aperture orifice, the pressure drop across the orifice may be varied so as to maintain the optimum condition. The effective aperture of such a variable aperture may be regulated by pressure sensing means in combination with automatic means to vary the effective aperture.

One example of a variable aperture orifice, although not necessarily for the intended purpose of scrubbing particle laden gases, is given by U.S. Patent 2,801,647 to Dorrel et al. and may be described as a louver type wherein rotating vanes or louvers are placed in parallel and rotated in opposite directions to thereby vary the effective aperture of a fixed aperture or opening in a duct. Such an arrangement, while apparently satisfactory for the intended purpose, is not suited for all types of gas scrubbing installations wherein the variable orifice device is subject to the deleterious action of extremely high temperature particle laden gases or to any situation where the action of the gases on the louver type vanes would be such as to cause or to necessitate frequent replacement thereof.

According to the practice of the present invention, a variable orifice scrubber assembly for a gas scrubbing device is provided with adjustable louver type vanes for effecting a variable orifice wherein the vanes are susceptible of easy replacement of the parts thereof exposed to the often deleterious effects of the particle laden gases which they are designed to control.

In the drawings:

FIGURE 1 is a plan view of a duct section provided with a variable aperture orifice and means for introducing liquid into the duct section.

FIGURE 2 is a cross-section taken along line 2—2 of FIGURE 1.

FIGURE 3 is a view taken along line 3—3 of FIGURE 2.

FIGURE 4 is a view taken along line 4—4 of FIGURE 3.

FIGURES 5 and 6 are perspective views of certain elements defining the louver type vanes illustrated in the preceding figures.

FIGURE 7 is a plan view of another type of element used in conjunction with the rotating louvers illustrated at FIGURES 1–3 inclusive.

Referring now to FIGURES 1 and 2 of the drawings, the numeral 10 denotes generally the variable orifice scrubber assembly according to this invention and comprises a cylindrical duct section having walls 12 and upper and lower flanges 14 and 16 adapted for coupling to complementary flanges on duct portions which the duct section 12 is adapted to join. The numeral 18 denotes a plate having a square central aperture therein with the plate being secured transversely across the longitudinal axis of the duct section. The numeral 20 denotes a centrally located aperture within plate 18 along whose four edges are secured longitudinal inserts 22 to which are attached at their upper portions clip elements 24 which cooperate with bracket elements 26 placed on the lower portion of elements 22 to hold the latter in position. Preferably, the elements 22 are formed of a refractory material or metal casings having a high resistance to the action of heat and abrasion and by virtue of the clips 24 and 26 attached thereto are easily replaceable. The numerals 28 denote flange type elbow fittings coupled to tubular elements 30 positioned in and supported by the cylindrical wall of duct section 12. A tubular nozzle 32 is coupled to one end of each elbow 28 and projects into the area of the duct section. As shown in FIGURE 1 of the drawings, there are preferably a plurality of such elbows 28 for injecting liquid into the gas stream which flows through duct segment. A cylindrical aperture 34 may be provided at one portion of the wall of the duct section for receiving a short flanged pipe section 36 adapted to receive a manhole cover 38. The aperture 34 may be termed an access aperture since the removal of the manhole cover 38 will permit access to the upper portion of plate 18 and also facilitates inspection of the below described louver elements.

The numeral 40 denotes either of a pair of shafts or rectangular cross section, one end of which is mounted in bearings 42 and the other ends of which pass through bearings 44. A bracket 46 is suitably secured to the duct section and supports bearings 42. Similarly, bracket 48 is also secured to the duct section and supports bearings 44 and also an automatic turning control element 50, the function of which will later be described. Bushing members 52 and 56 support shafts 40 at each place where they pass through the duct sections. Bushing 52 is supported by demountable plate 51 whose removal, together with bearing 42, permits the vane elements 70 and 80 (to later be described) to be slid off shafts 40 for replacement purposes. Pressure sensing elements 60 and 62 are positioned above and below, respectively, orifice plate 18 and the numerals 64 and 66 denote, respectively, lines preferably electrical, which feed signals corresponding to the pressure sensed by elements 60 and 62 to louver rotating element 50. The numeral 68 denotes a power input to element 50.

Referring now to FIGURES 3 through 7 of the drawings, the numeral 70 denotes any one of a plurality of generally elongated refractory elements having curved, generally semi-cylindrical portions 72 at the top of the bottom. Elements 70 are positioned immediately adjacent aperture 20 of plate 18 and generally medially of each of the shafts 40 which extend across duct section 10. As will be seen more particularly from an inspection of FIGURES 4, 5 and 6, each element 70 is provided at one face with an integral extending lip 74 extending around a square aperture 76 adapted to receive the shaft 40. The elements 70 are assembled as illustrated at FIGURE 4 of the drawings.

As shown at FIGURE 7 of the drawings, the numeral 80 denotes any one of a plurality of refractory elements each of which is provided at one face with an extending lip 82 preferably integral therewith. Further reference to FIGURE 4 discloses how elements 80 are assembled, each of their central apertures 84 being square in cross section to receive shaft 40. The refractory elements 70 and 80 are placed over shaft 40, much as in the manner of beads strung on a piece of string or wire. The endmost elements 80 abut column portions 53 and 57 of bushings 52 and 56 respectively.

The mode of operation of the above described variable orifice scrubber assembly is as follows. Particle laden gases pass upwardly through the duct section 12, i.e., from the direction below the shaft 40 towards the nozzles 32, with reference to FIGURE 2, and cleaning liquid, such as water, is injected through nozzle 32 into the gas flow stream.

The velocity of cleaning liquid ejection for various applications will vary and in certain applications this velocity is low. Pressure sensing elements 60 and 62 sense the downstream and upstream pressures, respectively, within the duct section 12 and signals corresponding to these pressures are fed into louver rotating element 50 through lines 64 and 66. By means of suitable gearing within element 50, the louver vanes 70 and shaft 40 are rotated to assume that specific angular relationship which will yield the optimum pressure drop at the gasliquid mixture zone which effects the maximum wetting of the particles within the gas. Reference to FIGURE 3 of the drawings shows that the angular position of louver element 70 may be varied from the solid position shown, which will yield a maximum effective aperture area, to the dotted position, which will yield a minimum effective aperture area. Thus the maximum angular displacement of each of the shafts 40 need only be 90°. The particulate laden gases striking the cast louver elements 70 and 80 create a turbulent volume which extends from the louver elements to the other side of aperture 20. The edges of elongated refractory elements 22 which are in the gas path also effect some turbulence and this further enhances the wetting of the particles in the gas from the liquid stream coming into the duct section through nozzles 32. While the louver rotating element in FIGURES 1 and 2 has been illustrated and described as automatic, as by a suitable servo mechanism as element 50, particularly in conjunction with pressure sensing elements 60 and 62, it will be understood that the shafts 40 may be manually rotated.

The worker in this art will recognize that the refractory elements 22, 70 and 80 are under the deleterious action of both heat, in the case of hot gases, and of the particles themselves carried thereby whether the gases be at extremely high or elevated temperatures or not. Continued operation of any variable orifice scrubber assembly, such as the assembly of this invention, will often result in an eventual requirement for a replacement of those parts or those elements in the gas stream which are subjected to the greatest wear. By virtue of the simplicity of construction of elements 22, 70 and 80, any material which is particularly suited to withstand the above enumerated deleterious actions of the particle laden gas stream which is to be wetted may be used. Thus, any type of refractory substance may be easily cast and employed as elements 22, 70 and 80. Similarly, the advent of an ever more numerous selection of materials, with the continued advancement of technology, any type of material may be employed for these elements, not necessarily one known as a refractory material. The requirement for sometimes frequent replacement of such elements as these demands a construction which will admit not only of easy replacement but of a simple shape or configuration of those elements which must be replaced. Here, the worker in this art will readily appreciate that elements 22, 70 and 80 are of simple shapes or configurations and thus admirably answer the above noted requirements.

What is claimed is:

1. A variable orifice gas scrubber assembly including: a housing having two open ends; a plate in said housing positioned generally transversely to the longitudinal axis thereof, said plate having an aperture therein, means in said housing positioned axially of said plate for injecting a liquid into the interior of said housing, a rotating louver element positioned within said housing and contiguous to said opening and extending generally transversely of said housing, said louver having a generally elliptical cross-section over at least a portion of its length, said louver comprising a plurality of stacked elements traversed by a shaft passing therethrough, said louver being slidable off its supporting shaft and adapted to be withdrawn therefrom and from the interior of said housing.

2. The variable orifice scrubber assembly of claim 1 wherein said louver comprises a first plurality of stacked elements each of which is generally elliptical in cross-section and a second plurality of stacked elements each of which is generally circular in cross section.

3. The variable orifice scrubber assembly of claim 2 wherein said stacked elements each comprise an element having an aperture therethrough and an integral lip on one side of said aperture mating with a complementary recess of an adjacent element.

4. The variable orifice scrubber assembly of claim 1 wherein the periphery of said aperture in said plate is lined with a heat and abrasion resistant element demountable therefrom, with a portion of said resistant element extending radially inwardly of the said periphery.

5. The variable orifice scrubber assembly of claim 1 including means to sense gas pressure in said housing on opposite sides of said aperture plate, and means for rotating said louver in response to a sensed difference in gas pressure across said aperture.

References Cited by the Examiner
UNITED STATES PATENTS

| | | | |
|---|---|---|---|
| 2,801,647 | 8/1957 | Dorrel et al. | 138—46 |
| 2,964,304 | 12/1960 | Rice. | |
| 3,189,332 | 6/1965 | Rehmus | 261—188 X |

HARRY B. THORNTON, *Primary Examiner.*

T. MILES, *Assistant Examiner.*